C. W. SVENSON.

COASTER HUB BRAKE.

Reissued July 28, 1914. 13,783.

APPLICATION FILED JUNE 9, 1914.

3 SHEETS—SHEET 1.

Witnesses:
Chas. W. Reed
Ida M. Kunzler

Inventor
C. W. SVENSON
By his Attorneys
Bartlett, Brownell & Mitchell

THE NORRIS PETERS CO., PHOTO-LITHO., WASHINGTON, D. C.

C. W. SVENSON.
COASTER HUB BRAKE.
Reissued July 28, 1914. 13,783.
APPLICATION FILED JUNE 9, 1914.
3 SHEETS—SHEET 2.
Fig. 2.
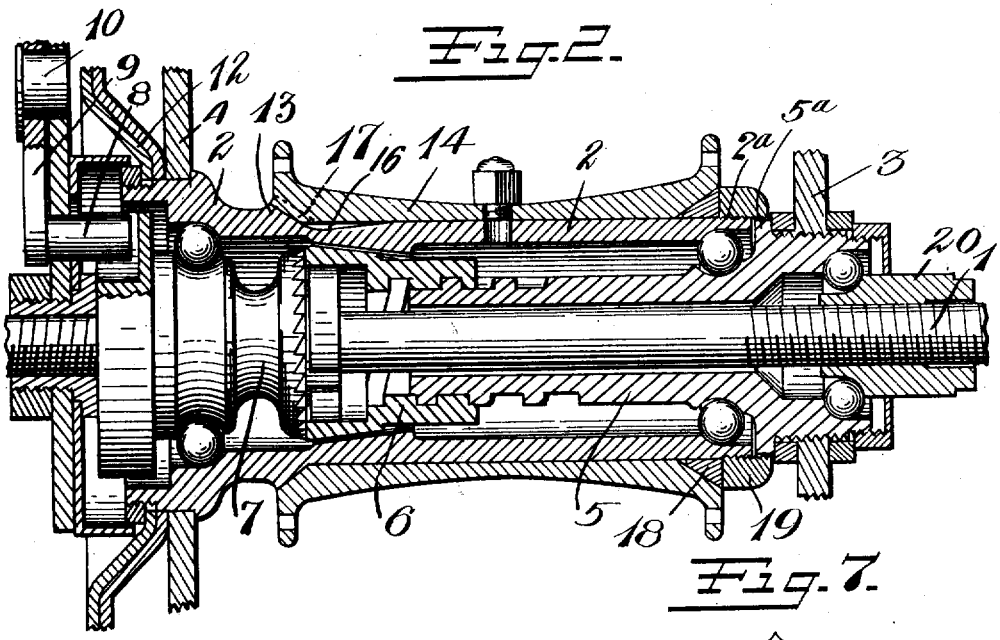
Fig. 7.
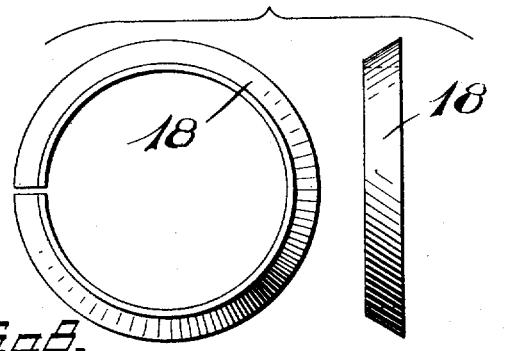
Fig. 6.
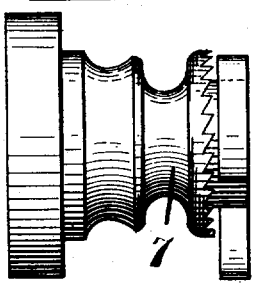
Fig. 8.
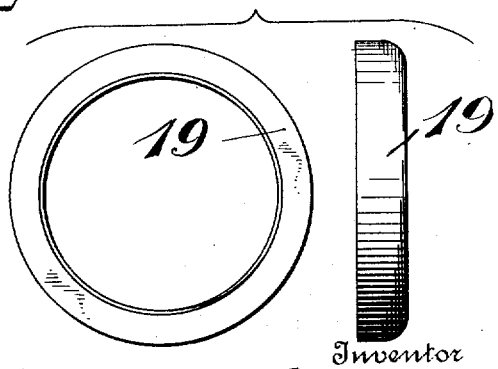
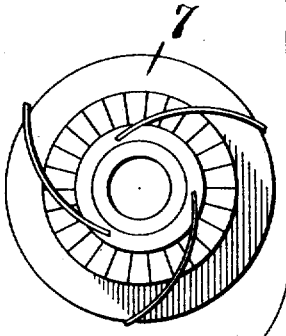
Witnesses:
Chas. A. Pearce
Geo. McNinzeker
Inventor
C. W. SVENSON
By his Attorneys
Bartlett, Brownell & Mitchell
THE NORRIS PETERS CO., PHOTO-LITHO., WASHINGTON, D. C.

C. W. SVENSON.
COASTER HUB BRAKE.
Reissued July 28, 1914. APPLICATION FILED JUNE 9, 1914. 13,783.
3 SHEETS—SHEET 3.
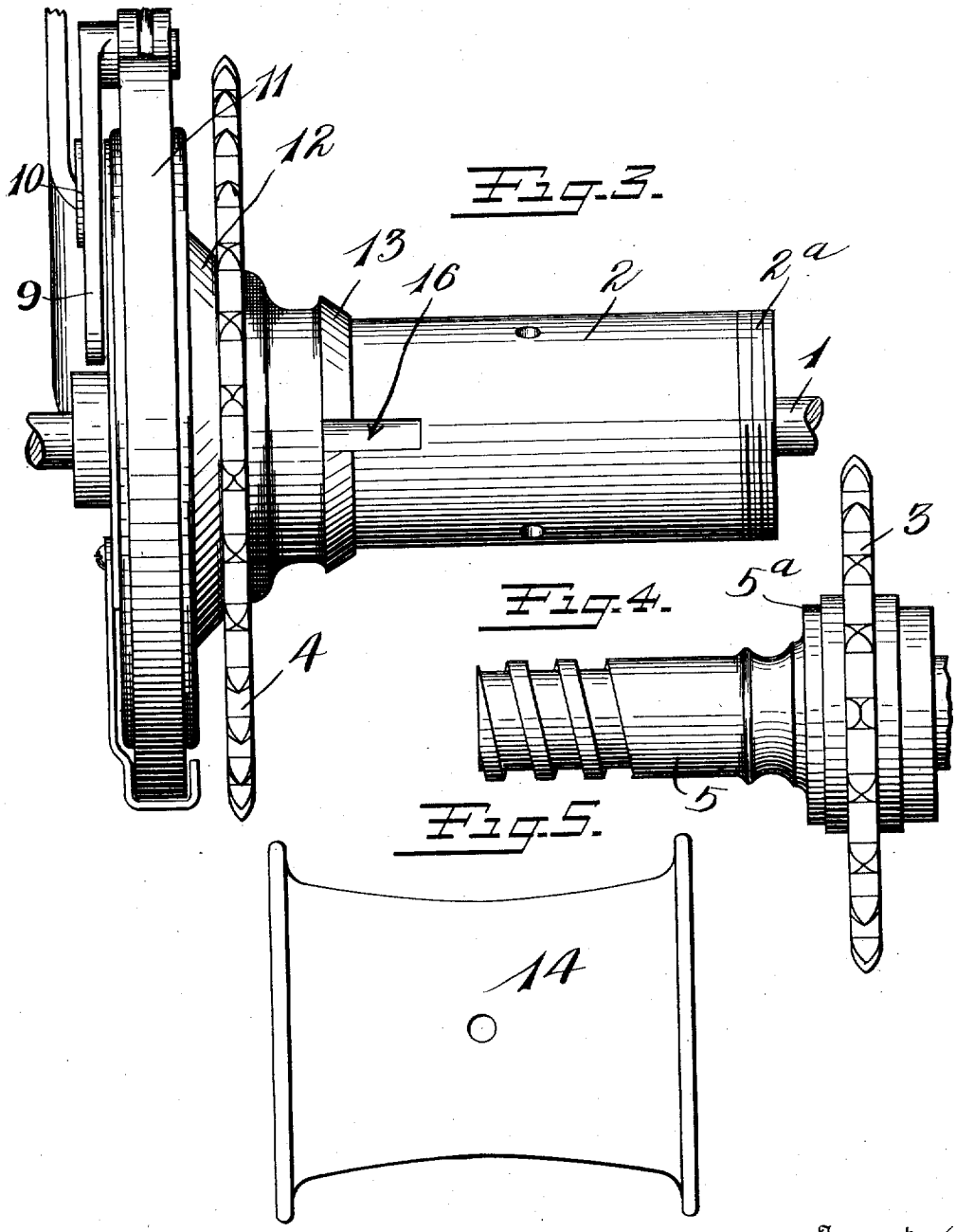
Witnesses:
Chas. A. Peard
Ida M. Kunziker
Inventor
C. W. SVENSON
By his Attorneys
Barrett, Browne & Mitchell
THE NORRIS PETERS CO., PHOTO-LITHO., WASHINGTON, D. C.

UNITED STATES PATENT OFFICE.

CHARLES WALFRID SVENSON, OF NEW BRITAIN, CONNECTICUT, ASSIGNOR TO THE AMERICAN HARDWARE CORPORATION, OF HARTFORD, CONNECTICUT, A CORPORATION OF CONNECTICUT.

COASTER HUB-BRAKE.

13,783. Specification of Reissued Letters Patent. Reissued July 28, 1914.

Original No. 1,097,568, dated May 19, 1914, Serial No. 782,419. Application for reissue filed June 9, 1914. Serial No. 844,015.

*To all whom it may concern:*

Be it known that I, CHARLES W. SVENSON, a citizen of the United States, residing at New Britain, in the county of Hartford, State of Connecticut, have invented certain new and useful Improvements in Coaster Hub-Brakes, of which the following is a full, clear, and exact description.

This invention relates to an improved form of coaster hub brake construction providing, in effect, a unitary construction of driving and braking mechanism, to which the hub of the driven wheel may be readily and quickly applied and from which it may be readily and quickly detached. These and other advantages will be more readily seen from the detailed specification following, taken in connection with the accompanying drawings forming part thereof and illustrating a preferable embodiment of my invention as applied to a standard type of coaster hub brake structure.

Figure 1:
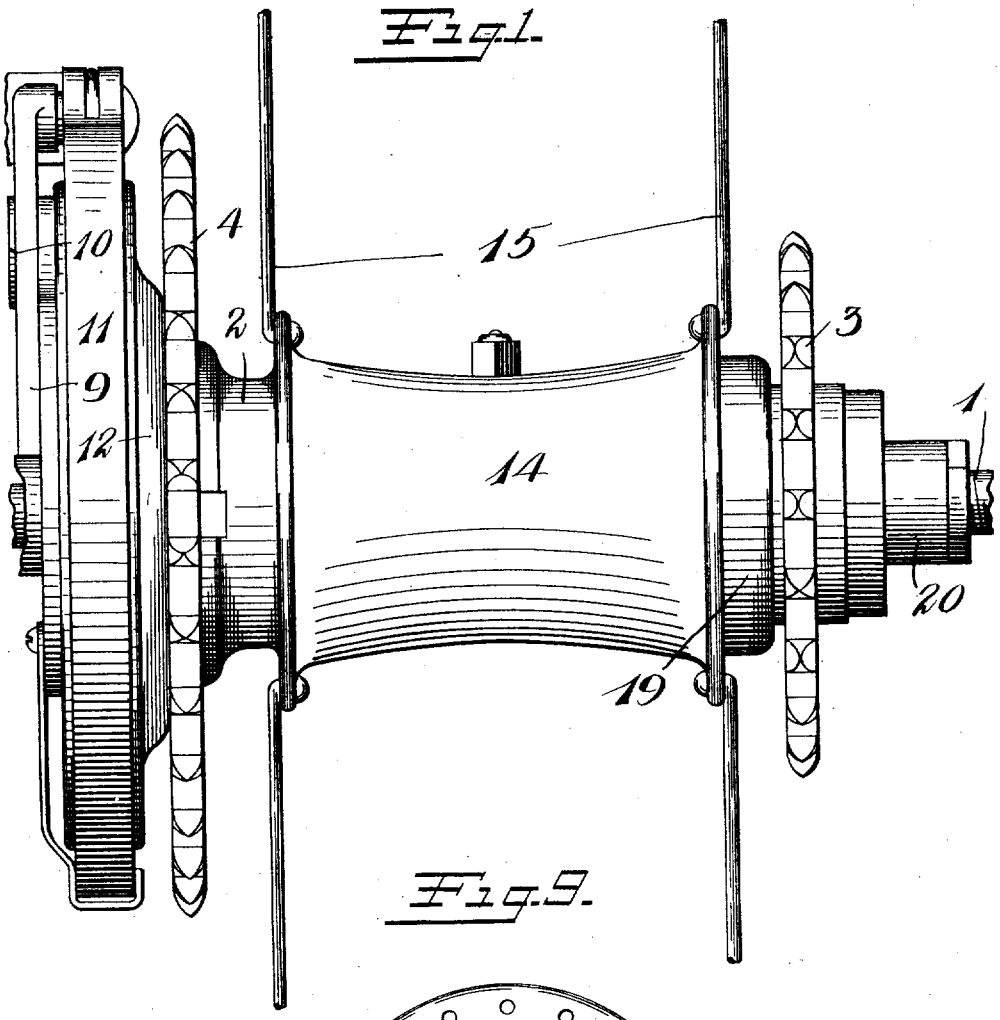
Figure 9:
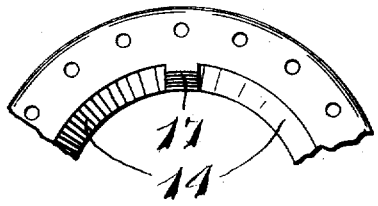

In these drawings Figure 1 is a top plan view of such a coaster brake hub mechanism embodying the present invention, the wheel hub only of the wheel structure being shown. Fig. 2 is a fragmentary longitudinal vertical section of the parts shown in Fig. 1. Figs. 3, 4 and 5 designate the separated parts of the coaster brake structure shown in Figs. 1 and 2 before assembling. Figs. 6, 7 and 8 show details of the coaster brake structure. Fig. 9 is a fragmentary view in end elevation of the wheel hub.

Referring to the drawings by numerals, 1 designates a central main supporting arbor, and 2 a hub sleeve revoluble about said arbor as an axis and constituting a preferred form of carrier for the wheel hub proper. 3 designates a driver or sprocket such as is usually employed for driving by foot power, this driver being rigidly carried by a clutch sleeve 5 having a worm thereon engaging with a worm on the relatively movable clutch member 6, whereby movement of the driver 3 and clutch sleeve 5 in one direction brings the conical face of the clutch member 6 into frictional driving engagement with the beveled inner face of the hub sleeve 2, and whereby movement in the opposite direction engages its toothed edge with the toothed edge of the brake operating sleeve 7, to operate through suitable mechanism a band brake. In the drawings, I am only partially illustrating such a brake mechanism, as the specific form shown forms no part of the present invention and is described and illustrated in detail in my prior Patent No. 1,060,511, dated April 29th, 1913.

In the drawings, 8 indicates a pin engaged by the sleeve 7 and operating a lever 9, which lever is pivoted at 10 and moves a brake band 11 into frictional braking engagement with a barrel 12 fixedly secured to the end of the hub sleeve 2.

4 designates a second and power controlled driving member or sprocket, fixedly carried by hub sleeve 2 at the end opposite the foot controlled driving member 3.

The end of the hub sleeve 2 adjacent the brake mechanism and power sprocket 4, is provided with a raised annular flange 13 having a beveled edge and forming an abutment shoulder. 14 is the wheel hub proper, the same being designed to be detachably mounted upon and in driving engagement with the hub sleeve or carrier 2, with one end abutting against the flange 13. The wheel hub 14 will, of course, carry the wheel structure, the spokes being suitably attached to said hub 14. In the drawings, I have shown wire spokes 15. This detachable driving engagement of the wheel hub 14 with the hub sleeve 2 is effected by a sliding movement of the wheel hub 14 longitudinally of this hub sleeve 2. In order to provide for driving engagement between the two, I may form the hub sleeve 2 with one end preferably with a plurality of key ways 16 (Figs. 2 and 3), each key way extending from the periphery of the hub sleeve 2 longitudinally of the sleeve and transversely of the flange 13. The inner face of the wheel hub 14 is provided with a key or keys 17 corresponding in shape and relative position, to the key way or ways 16. The key ways and keys are preferably shaped to provide a firm wedging engagement by longitudinal sliding engagement of the wheel hub on the hub sleeve, so that the former will be firmly engaged with the latter by such sliding movement and yet may be easily detached therefrom.

The driver 3 and its lock nut are first removed from the clutch sleeve 5 and the hub 14 of the wheel is then slid over this end of the hub sleeve 2 and moved longitudinally of the hub sleeve to engage its key or keys 17 within the key way or key ways 16 of the hub sleeve, firmly locking the wheel and its hub to this sleeve 2, the edge of the flange 13 of this sleeve forming an abutment against which the wheel hub is held by suitable means such as follows. The clutch sleeve 5 carrying its sprocket 3, is provided with a flange 5[a], preferably of slightly less diameter than the sleeve 2, this flange upon the insertion of the clutch sleeve within the hub lying adjacent the threaded end 2[a] of the hub sleeve. The end of the wheel hub 14 is provided with a conical recess therein, designed to receive a corespondingly shaped split ring 18. This ring is forced against the inner recessed face of the wheel hub by means of a threaded ring 19 engaging the threaded end 2[a] of the hub sleeve 2 and screwing up against the outer face of the split ring 18, thereby contracting said ring to grip hub sleeve 2 and at the same time holding the other end of the wheel hub securely against the annular flange 13 of the hub sleeve with its keys in locked and driving engagement with the key ways of said hub sleeve. The threaded ring 19 is preferably of sufficient width to overlap the adjacent edges of the end of the hub 2 and of the flange 5[a] of the clutch sleeve 5, so that it acts also as a dust cap to prevent the entrance of dust, grit, etc., within the hub sleeve 2. The clutch sleeve 5 with its associated bearings is held on the main arbor 1 in properly adjusted position by any suitable means, such as the usual cone 20, which is screwed on the threaded end of the main arbor 1 and against the ball bearing. The flange 5[a] of the clutch sleeve is held spaced from the end of hub sleeve 2.

The feature of having a wheel hub separate entirely from the coaster brake mechanism is productive of numerous advantages. For instance, previously assembled and tested coaster hub brakes may be shipped to a manufacturer from one source and wheels with their hubs shipped from another source and the two parts quickly assembled without disturbing the adjustment of the coaster brake mechanism, so that the time in assembling is decreased and the output correspondingly increased. Again, the user of the vehicle brake and removable wheel hub, may readily have either the old coaster brake mechanism replaced by new and previously assembled brake mechanism, or may have a new wheel with its hub applied in minimum time. This is especially desirable when the coaster brake apparatus is used on a racing vehicle.

From the foregoing, it will be seen that I have devised a form of coaster brake construction embodying many advantages such as recited above. I have herein illustrated and described a specific form of my invention, and of a coaster brake mechanism with which it may be advantageously utilized, but I desire it understood, that the invention itself and the specific form of coaster brake device may be widely varied within the spirit of the present invention and the scope of the appended claims.

The coaster brake mechanism provides an assembled unitary coaster brake structure which may be quickly and easily applied to wheel structures of the character herein described without disturbing the adjustment of the assembled parts in the slightest. In order to mount a wheel hub with its wheel structure on this assembled coaster brake or vice versa, it is only necessary to unscrew the sprocket 3 and its lock nut from the clutch sleeve 5 and then insert the wheel hub over this end of the hub sleeve 2, or vice versa, and lock the parts together as heretofore described, the sprocket 3 and its lock nut being subsequently replaced. The entire assembling or replacing operation is accomplished in a minimum time and without disturbing in the slightest the adjustment of the parts of the coaster brake mechanism.

What I claim, therefore, and desire to secure by Letters Patent is:

1. In a device of the character described, a supporting arbor, a carrier rotatable thereon, a driving member carried by and rotatable on said arbor, means within said carrier and operable by movement of said member to clutch and unclutch the same with said carrier, a wheel hub arranged to seat over said carrier, and means for detachably holding said wheel hub in driving engagement with said carrier.

2. In a device of the character described, a supporting arbor, a carrier rotatable thereon, a driving member carried by and rotatable on said arbor, means operable by movement of said member to clutch and unclutch the same with said carrier, and a wheel hub arranged to slide longitudinally over said carrier and means for interlocking said parts against independent rotation, said interlocking being effected by said longitudinal movement of said hub on said carrier.

3. In a device of the character described, a supporting arbor, a carrier rotatable thereon, a foot controlled driving member carried by and rotatable on said arbor, a power controlled driving member fixedly carried by said carrier, means operable by movement of said foot controlled member to clutch and unclutch said foot-controlled member with said carrier, a wheel hub arranged to seat over said carrier, and means for detachably holding said wheel hub in driving engagement with said carrier.

4. In a device of the character described, a supporting arbor, a carrier rotatable thereon, a foot controlled driving member carried by and rotatable on said arbor, a power controlled driving member fixedly carried by said carrier, means operable by movement of said foot controlled member to clutch and unclutch the same with said carrier, and a wheel hub arranged to slide longitudinally over said carrier and coöperating interlocking means on said hub and carrier arranged to interlock by longitudinal movement of said parts.

5. In a device of the character described, a supporting arbor, a carrier rotatable thereon, a foot controlled driving member carried by and rotatable on said arbor, a power controlled driving member fixedly carried by said carrier, braking mechanism coöperating with said carrier, means operable by movement of said foot controlled member in one direction to clutch the same with said carrier and operable by movement in the reverse direction to unclutch the same and to operate said braking mechanism, a wheel hub arranged to seat over said carrier, and means for detachably holding said wheel hub in driving engagement with said carrier.

6. In a device of the character described, a supporting arbor, a carrier rotatable thereon, a foot controlled driving member carried by and rotatable on said arbor, a power controlled driving member fixedly carried by said carrier, braking mechanism coöperating with said carrier, means operable by movement of said foot controlled member in one direction to clutch the same with said carrier and operable by movement in the reverse direction to unclutch the same and to operate said braking mechanism, and a wheel hub arranged to slide longitudinally on said carrier and coöperating interlocking means on said hub and carrier arranged to interlock by longitudinal movement of said parts.

7. In a device of the character described, an assembled unitary coaster brake mechanism embodying a supporting arbor, a carrier rotatable thereon, braking means coöperating with said carrier, clutch mechanism coöperating with said carrier, a driving member rotatable about said arbor and a clutch actuating member connected thereto and coöperating with said clutch mechanism and braking means to clutch said member to said carrier in one direction of movement of said driving member and to unclutch the same and operate said braking means in the reverse direction of movement, and a wheel hub separate from said carrier and said coaster brake mechanism and arranged to be seated over said carrier and in driving engagement therewith without disturbing the adjustment of the assembled coaster brake mechanism.

8. In a device of the character described, an assembled unitary coaster brake mechanism embodying a supporting arbor, a carrier rotatable thereon, braking means coöperating with said carrier, clutch mechanism coöperating with said carrier, a driving member rotatable about said arbor and a clutch actuating member connected thereto coöperating with said clutch mechanism and braking means to clutch said member to said carrier in one direction of movement of said driving member and to unclutch the same and operate said braking means in the reverse direction of movement, a wheel hub separate from said carrier and said coaster brake mechanism and arranged to be slid longitudinally on said carrier without disturbing the adjustment of the assembled coaster brake mechanism, and means on said hub and carrier coöperating on such relative longitudinal movement to interlock in driving engagement.

9. In a device of the character described, an assembled unitary coaster brake mechanism embodying a supporting arbor, a carrier rotatable thereon, a power-controlled driving member fixedly carried by said carrier, braking means coöperating with said carrier, clutch mechanism coöperating with said carrier, a clutch-actuating member rotatably mounted on said arbor, a foot-controlled driving member detachably fixed to said clutch-actuating member, said actuating member coöperating with said clutch mechanism and braking means to clutch said member to said carrier in one direction of movement of said driving member, and to unclutch the same and operate said braking means in the reverse direction of movement, and a wheel hub separate from said carrier and said coaster brake mechanism and arranged to be seated on said carrier upon the removal of said foot-controlled driving-member from said clutch actuator, said hub and carrier being arranged to detachably interlock in driving engagement.

10. In a device of the character described, a supporting arbor, a carrier rotatable thereon, a driving member carried by and rotatable on said arbor, means operable by movement of said member to clutch and unclutch the same with said carrier, a wheel hub arranged to slide longitudinally on said carrier, coöperating means on said carrier and wheel hub arranged upon such relative longitudinal sliding movement to detachably key said parts together in interlocked driving relation, and means to retain said wheel hub on said carrier and against longitudinal movement.

11. In a device of the character described, a supporting arbor, a carrier rotatable thereon, a foot controlled driving member carried by and rotatable on said arbor, a power controlled driving member fixedly carried by said carrier, means operable by movement of said foot controlled member to clutch and unclutch the same with said carrier, a wheel hub arranged to slide longitudinally on said carrier, coöperating means on said carrier and wheel hub arranged upon such relative longitudinal sliding movement to detachably key said parts together in interlocked driving relation, and means to retain said wheel hub on said carrier and against longitudinal movement.

12. In a device of the character described, a supporting arbor, a carrier rotatable thereon, a foot controlled driving member carried by and rotatable on said arbor, a power controlled driving member fixedly carried by said carrier braking mechanism coöperating with said carrier, means operable by movement of said foot controlled member in one direction to clutch the same with said carrier and operable by movement in the reverse direction to unclutch the same and to operate said braking mechanism, a wheel hub arranged to slide longitudinally on said carrier, coöperating means on said carrier and wheel hub arranged upon such relative longitudinal sliding movement to detachably key said parts together in interlocked driving relation, and means to retain said wheel hub on said carrier and against longitudinal movement.

13. In a device of the character described, a coaster brake mechanism including an arbor, a carrier mounted for rotation relatively to said arbor, a rotatable driver, with means for coupling and uncoupling said driver and carrier for coasting, driving or braking, and a wheel hub removably mounted upon said carrier and independent of said coaster brake mechanism, with means for locking said hub on said carrier against independent rotation.

14. In a device of the character described, a coaster brake mechanism comprising a central support, a carrier associated therewith, driving means, means for coupling and uncoupling said driving means with said carrier for conjoint or relative independent rotation, a wheel hub detachably mounted upon said hub carrier and independent of said coaster brake mechanism, with means to lock said mounted hub on said carrier against independent rotation.

15. In a device of the character described, coaster brake mechanism comprising a central support, a carrier associated therewith, driving means, means for coupling and uncoupling said driving means with said carrier for conjoint or relative independent rotation, a wheel hub detachably mounted upon said carrier and independent of said coaster brake mecnanism, with means to lock said mounted hub on said carrier against independent rotation, said hub being slidable longitudinally on said carrier, and said parts having coöperating interlocking means arranged to interlock by longitudinal movement of said parts.

16. In a device of the character described, coaster brake mechanism comprising a central support, a carrier associated therewith, driving means, means for coupling and uncoupling said driving means with said carrier for conjoint or relative independent rotation, a wheel hub detachably mounted upon said hub carrier and independent of said coaster brake mechanism, said hub being slidable longitudinally on said carrier, and said parts having coöperating interlocking means arranged to interlock by longitudinal movement of said parts, said means comprising coöperating wedging keys and key-ways.

CHARLES WALFRID SVENSON.

Witnesses:
Geo. P. Spear,
R. R. Brown.

Copies of this patent may be obtained for five cents each, by addressing the "Commissioner of Patents, Washington, D. C."